Jan. 9, 1951  B. JOOS  2,537,833
APPARATUS FOR NEBULIZING LIQUIDS
Filed April 9, 1947

Bernhard Joos, Inventor
by Emery, Varney, Whittemore & Dix
Attorneys

Patented Jan. 9, 1951

2,537,833

UNITED STATES PATENT OFFICE 2,537,833

APPARATUS FOR NEBULIZING LIQUIDS

Bernhard Joos, Schaffhausen, Switzerland

Application April 9, 1947, Serial No. 740,462
In Switzerland September 12, 1946

6 Claims. (Cl. 261—91)

The invention relates to a new and highly efficient apparatus for nebulizing liquids.

It is an object of the invention to provide apparatus for effecting a disintegration of liquid in such degree as to produce a floating mist. Said liquid may contain suitable chemical agents in a state of suspension for disinfecting rooms, for hygienic, prophylactic and therapeutic purposes—such as inhalations—for repelling and destroying insect pests and parasites, for impregnating, mordanting, dyeing, sizing and finishing textiles, for preventing rot and putrefaction, and for all other purposes to which chemical agents in the aforementioned state of high dispersion can be advantageously employed.

For converting a liquid into a floating mist, a thin layer or film of the liquid is conveyed to a rotating distributor surface, or a series of such distributor surfaces, which by centrifugal action throw the liquid against disintegrator surfaces supplied with apertures for the passage of the nebulized liquid.

The apparatus according to the invention is characterized by the combination of at least one rotating distributor disk with a stationary disintegrator device consisting of a ring fitted with baffle plates or blades, and apertures, and preferably arranged concentric and proximately to the rotary distributor disks.

Further distinctive features of the invention will be disclosed by the specification, the claims and the annexed drawings.

A preferred embodiment of the invention selected for purposes of illustration is shown in the accompanying drawings, in which, Figure 1 is a vertical section through the apparatus.

Figure 1:
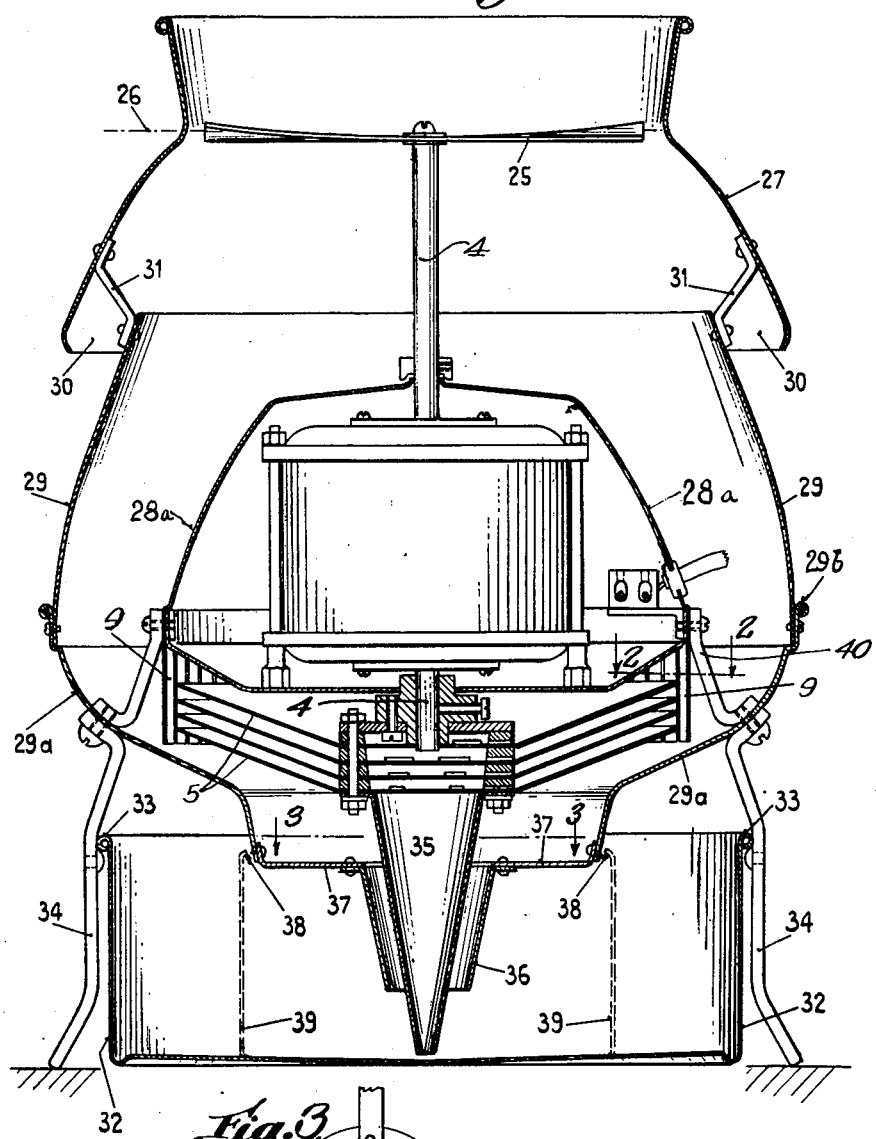
Figure 3:
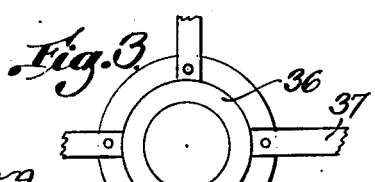
Figure 3 is a section on the line 3—3 of Figure 1.
Figure 2:
Figure 2 is a section on the line 2—2 of Figure 1.

Referring to the drawings, the apparatus is enclosed within a globular casing 29 standing on the feet 34. The casing 29 has a circular section and in its vertical axis an electric motor is placed. The motor is enclosed within a housing 28a and the motor and housing are rigidly connected to the aforementioned casing 29 by struts 40. The motor is preferably of the type with a squirrel cage armature and the shaft 4 is in a vertical position. The lower end of the shaft 4 bears a constructional unit consisting of one or more distributor disks 5 connected to a removable conical suction tube 35, arranged so that its smallest diameter is at the lower end. The connection of the suction tube 35 to the flat disks 5, arranged above each other, is effected in such manner that a gradual and smooth transition is provided from the inner walls of the suction tube 35 to the upper surfaces of the disks 5. The drive motor is of such type and arrangement that the peripheral speed of the disks 5 is over 200 meters per sec. The upper end of shaft 4 is supplied with a propeller 25 which causes flow of air through the casing from the bottom of the discharge opening. The distributor and vaporizing disks 5 are surrounded by a disintegrator ring mounted on said motor housing, said ring comprising a series of blades or baffles 9 extending downwardly therefrom into close proximity with the casing 29a. Said blades effect a further disintegration of the drops ejected by the disks 5. As shown in Figs. 1 and 2 the lower ends of the blades are free and the blades are arranged in the direction of the centrifugal tangents of the disks 5. It is also possible to provide the disintegrator ring with adjustable blades. The disintegrating effect of the blades 9 can be increased by employing slightly curved blades as shown in Figure 2.

The blades 9 are spaced to provide passages for the mist which is conducted upwards by the action of the propeller 25 and guided by the inner walls of the casing 29. Beneath the housing 1 a container 32 is placed for the liquid to be nebulized and the suction tube 35 dips into this container 32.

The apparatus operates as follows:

After switching on the drive motor the disks 5 rotate together with the suction tube 35 which by centrifugal action sucks the liquid from the container 32. A thin layer or film of the liquid is formed in the upper part of the suction tube 35 which spreads over the top surfaces of the disks 5 and is furthermore forced outwards by centrifugal forces. In consequence of the high speed of the rotating disks 5 the liquid film on their upper surface is disintegrated so effectively that a nebulization already occurs in this part of the apparatus. The dispersed liquid is thrown towards the disintegrator blades 9, passes through the passages between the blades and is ejected towards the adjacent walls of the casing. By passage through the disintegrator ring the vapor is completely nebulized and flows in the state of a mist towards the propeller 25 which distributes the nebulized liquid.

For the production of a homogeneous, dry, floating mist it is important that the propeller 25 is situated in a position to control the narrowest section 26 of the housing, and furthermore that the walls of this part of the housing are adapted in their shape to the vertical section of the discharged body of mist. For such purpose the upper part of the housing 27 is dome-shaped and is provided with a constricted neck at the level in which the propeller blades operate. As the section of the body of mist is narrowest at the level of the propeller the aerodynamically most favorable shape is thereby obtained for the upper part of the housing 27. This construction prevents effectively the formation of fluid droplets with the result that a concentrated mist of permanent stability is discharged from the apparatus.

Furthermore it has proved practical to subdivide the housing vertically, whereby the lower two-part jacket 29, 29a encloses the disintegrator blades 9 and by connection to the dome-shaped cover 27 provides an annular inlet 30 for aspirating ambient air. The upper dome-shaped housing 27 can for example be supported on the lower part by three or four struts 31.

Furthermore it has proved advantageous to provide a larger free space between the lower part of the housing 29 and the motor hood 28a than required by the section of the body of mist, whereby means are provided for throwing the heavier droplets present in the mist against the inner walls of the housing part 29, from which they flow back into the container 32 or 39. Such arrangement effects practically a filtration of the mist.

The largest diameters of the housing-parts 27 and 29 are adapted to each other in such manner that the protruding ring for fastening the lower parts of the housing 29 and 29a provides a channel for collecting the drops flowing from the upper dome-shaped part of the housing 27 and from the air inlet 30. The channel aforementioned is provided with an outlet which leads the collected liquid back into the container whereby soiling of the floor is prevented.

The following arrangement has proved to be practical:

Stock containers 32 (Fig. 1) are employed with an upper beaded rim 33 for fitting the same to the frame 34. As such ordinary containers are not usually supplied with an inner flap to prevent turbulescence of the liquid in the container, it is practicable to fit for such purpose the lower part of the housing 29a with a short tube 36 by the flanges 37. This nozzle 36 is rigidly connected to the housing and surrounds the revolving suction tube 35.

For facilitating the use of smaller containers the lower part of the housing 29a can be supplied with flaps 38 of appropriate shape for connecting smaller containers (drawn in dotted lines).

All parts of the apparatus excepting the motor can consist of moulded plastics.

For further increasing the nebulizing effect of the apparatus the following devices and measures have proved to be efficient:

The blades 9 can be made of highly elastic and resilient material. The disintegrator blades can also consist of a cylindrical ring supplied with vertical or horizontal slots the width of which increases from base to top. The blades can be constructed in such manner that the impact of the liquid particles against the blades imparts mechanical vibrations to the blades of a frequency above the upper auditory threshold. By such means the disintegrating effect exerted on the liquid can be increased in high degree and the nebulization can be carried out much farther than with normal rigid blades. It has proved possible to produce in such manner mists consisting of droplets with an average diameter of $10\mu$, eminently suitable for many purposes to which the invention can be applied.

The stock containers 11 or 22 can be fitted with a beak for facilitating their introduction beneath the suction tube 7 or 15.

According to the invention a nebulizing process and an apparatus for nebulizing liquids has been made available that effects a disintegration of liquids in such measure to produce a floating mist eminently suitable for room disinfection. For the complete penetration of a room into every corner and all cavities and cracks and the disinfection of curtains, upholstery, beds, furniture etc. it is absolutely necessary that the liquid vehicle of the disinfecting agents is reduced to exceedingly small droplets. This basic requirement is achieved by the invention in comparatively a short time. The liquid is not only nebulized but converted into a floating mist and partly a gaseous state whereby the desired effect is obtained rapidly. Protracted experiments with the method and apparatus according to the invention have shown that an efficient disinfection can be obtained in less than 4 minutes per cubic metre.

The possibility to fill a room completely with a floating mist incorporating effective antiseptic agents is particularly valuable for hospital wards and operating theatres.

The main features of the process and apparatus for converting a liquid into a floating mist have been described and attention has been drawn to the fact, that such high state of dispersion is necessary for maintaining the suspension of the active chemical agents and their penetration into every part of a room.

Practical experiments have, however, shown that even mists produced according to the invention are in some cases not fully satisfactory and that the liquid requires the additioin of a certain quantity of a suitable substance for reducing the surface tension of the liquid and increasing the wettability of the chemical agents to be dispersed. Such additions have the advantage to increase the stability of the mist and to prevent in high measure any tendency to agglomeration of the exceedingly small droplets. Suitable additions for such purpose are for example alkyl-sulfonic-acid salts, alkyl-sulfuric-acid salts, or condensates of ethylene-oxide.

The apparatus may be used for nebulizing liquids and for discharging the same in the form of an aerosol mist used for a variety of purposes. Thus, if water alone is nebulized, the apparatus may be used for humidification. On the other hand, various chemicals or pharmaceutical preparations may be added to the liquid for various purposes such as medication, disinfecting and the like. The apparatus is of general application for these and similar purposes.

I claim:

1. Apparatus for nebulizing liquids and discharging the same in the form of an aerosol mist, comprising, a casing, said casing having a discharge opening at the top thereof and an air intake opening at the bottom thereof, a vertical shaft in said casing, a motor for driving said shaft, a housing surrounding and enclosing said motor and spaced from said casing to provide a passage through which air moves from said intake opening to said discharge opening, a propeller secured to the upper end of said shaft near said discharge opening, a suction tube secured to said shaft at the lower end thereof, a distributor disk secured to and extending outwardly from the upper end of said suction tube, a stationary disintegrator ring surrounding said distributor disk, said ring having a multiplicity of baffles spaced to provide passages therebetween through which liquid particles discharged from said distributor disk may pass, said baffles extending across the major portion of said passage between said motor housing and said casing, said propeller having blades inclined to cause air to flow through said passage between said motor housing and said casing and through the passages between said baffles and out through said discharge opening.

2. Apparatus as claimed in claim 1 in which the wall of the casing curves under said baffles and curves upwardly outside said baffles to intercept some of the heavier liquid particles which pass through the passages between said baffles.

3. Apparatus as claimed in claim 1 in which said disintegrator ring is mounted on said motor housing and in which said baffles extend downwardly therefrom into close proximity with said casing.

4. Apparatus as claimed in claim 1 in which said baffles are arranged so that the passages therebetween are substantially aligned with the direction of the liquid particles discharged from said disintegrator disk and in which said baffles consist of elastic, resilient blades which vibrate at high frequency under the impact of the liquid particles discharged from said distributor disk.

5. Apparatus as claimed in claim 1 in which said casing is provided with a constricted neck near said discharge opening and in which said propeller is located at the level of the narrowest portion of said constricted neck.

6. Apparatus as claimed in claim 1 in which said disintegrator ring is mounted on said motor housing and in which said baffles extend downwardly therefrom into close proximity with said casing and in which the lower ends of said baffles are free to vibrate under the impact of the liquid particles discharged from said distributor disk.

BERNHARD JOOS.

REFERENCES CITED

The following references are of record in the file of this patent:

UNITED STATES PATENTS

| Number | Name | Date |
|---|---|---|
| 1,626,667 | Cramer et al. | May 3, 1927 |
| 1,744,826 | Cutler | Jan. 28, 1930 |
| 1,892,694 | Carter | Jan. 3, 1933 |
| 1,993,299 | Prott | Mar. 5, 1935 |
| 1,994,912 | Hochstetter | Mar. 19, 1935 |
| 2,047,025 | Gilbert | July 7, 1936 |
| 2,157,416 | Kjos | May 9, 1939 |
| 2,188,439 | Kirkpatrick | Jan. 30, 1940 |
| 2,207,774 | Barthelemy | July 16, 1940 |
| 2,362,964 | Affleck | Nov. 21, 1944 |